May 7, 1929. W. WINSHIP 1,712,372
APPARATUS FOR HEAT TREATMENT OF LIQUIDS
Filed March 30, 1926 2 Sheets-Sheet 1
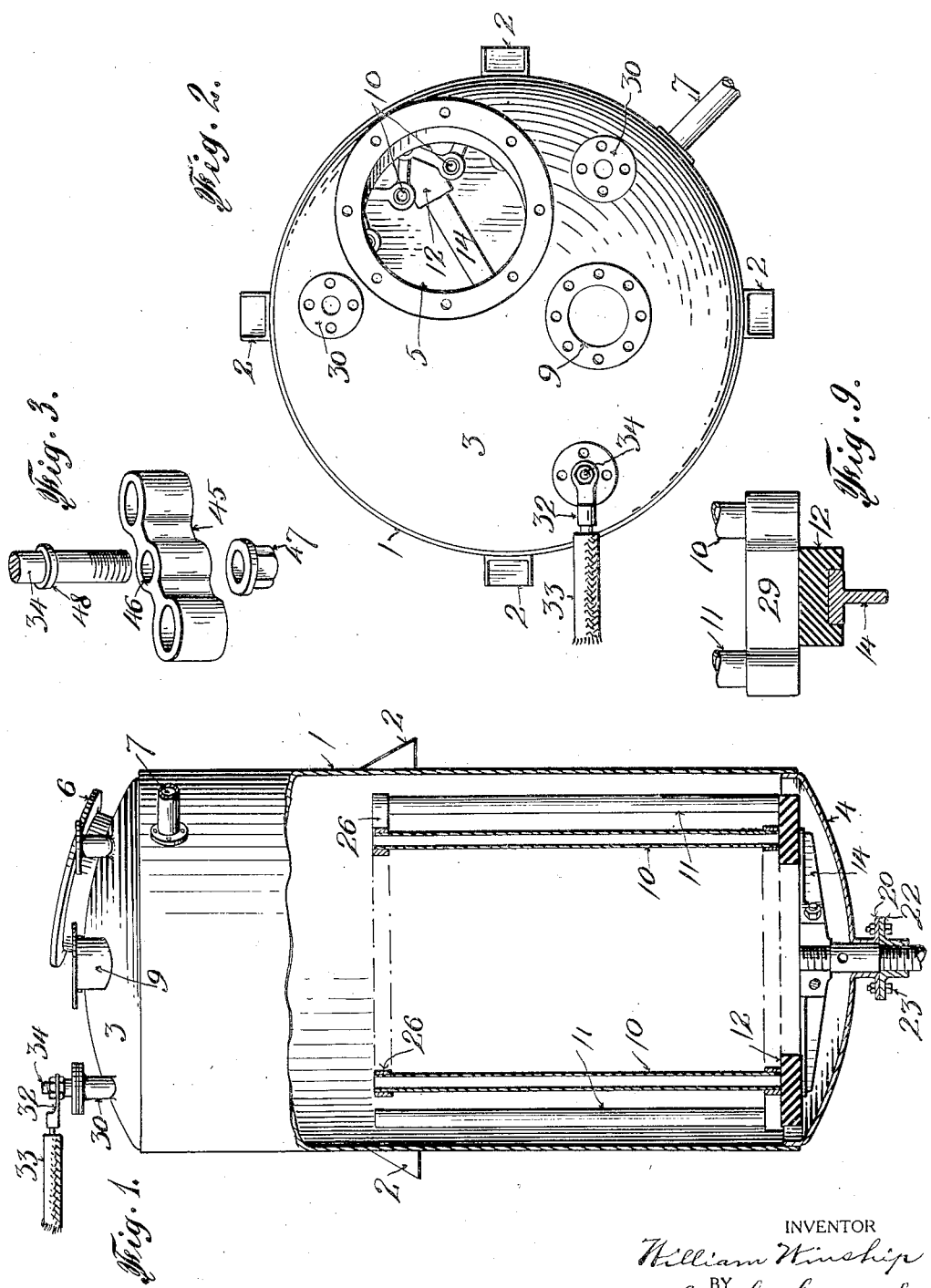
INVENTOR
William Winship
BY
Charles G. Hensley
ATTORNEY May 7, 1929.  W. WINSHIP  1,712,372
APPARATUS FOR HEAT TREATMENT OF LIQUIDS
Filed March 30, 1926   2 Sheets-Sheet 2
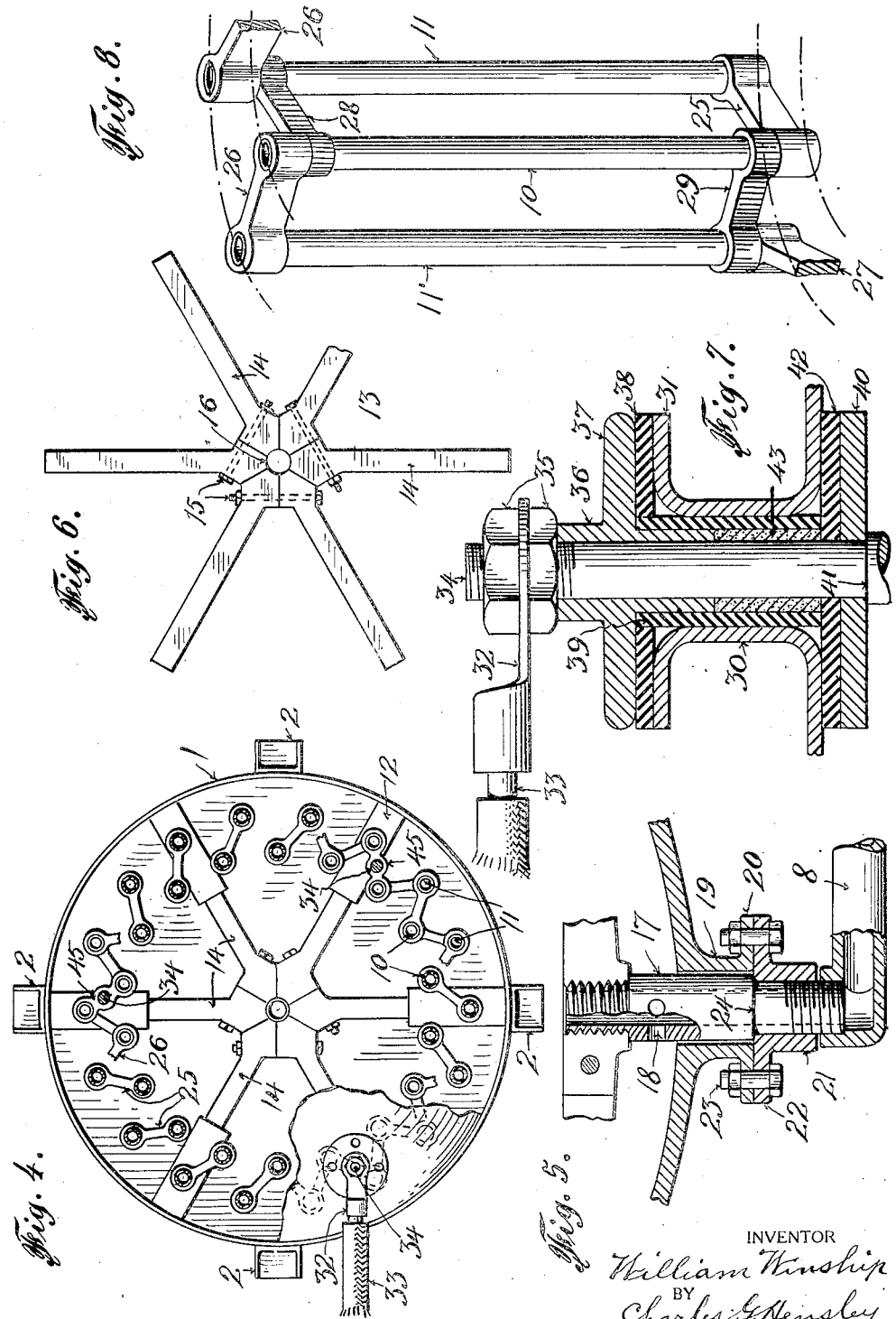

Patented May 7, 1929.

1,712,372

UNITED STATES PATENT OFFICE.

WILLIAM WINSHIP, OF BAYONNE, NEW JERSEY.

APPARATUS FOR HEAT TREATMENT OF LIQUIDS.

Application filed March 30, 1926. Serial No. 98,439.

The present invention relates to an apparatus for treating liquids to the action of heat and it is adapted to be used in separating various liquids for evolving vapors or volatiles therefrom and for various other processes in which a liquid is to be heated. One object of the invention is to provide for rapidly raising the temperature of a liquid without subjecting it to destructive heat such as might cause the throwing down of carbons such as might be contained in oils, in order that the desired separation may be accomplished without the destructive action which might otherwise be caused. When a high temperature is used to speed the process of heating a liquid in the present apparatus high resistance, tubular conduits are arranged within a tank or container, which may be either open or closed, according to the process, and these conduits or tubes are of such high electrical resistance and of such diameter, length and thickness of wall as to provide the proper current and voltage in the electrical circuit as may be required by the particular design of apparatus and the process to be carried out with it. The heater is based on the principle of electrical resistance as a means for generating the heat and it is adapted to be operated either by direct current or by single or polyphase alternating current.

In other heating apparatus for liquids of the electrical type, depending upon induction or resistance for generating the heat, there has been the objectionable feature of low efficiency or power factor, whereas in the present case there is a high power factor as well as a high heating efficiency. In the present case the heating elements consist of upwardly extending, or preferably vertical, tubes connected at or near their ends to form a series or series parallel circuit, and these tubes are completely immersed in the liquid under treatment so that they provide both interior and exterior heating surfaces so that the maximum of heat generated by the tubes acts directly upon the liquid, giving an extremely high efficiency. Owing to the vertical position of these tubes, which are open at remote points, preferably at both ends, a very rapid circulation of the liquid is set up within the tubes, causing rapid flow of the liquid upwardly through them during which movement the heat generated in the tubes is rapidly imparted to the liquid. Due to the rapidity of the movement of the liquid along the surfaces of the tubes, the speed with which the heat is conducted from the tubes to the liquid is very high and therefore the tubes may have a higher resistance and therefore a greater heat generating factor than if the liquid were in a slower state of motion where it is in contact with the heating surfaces.

It is desirable in the present apparatus to so design the parts that the surface of the heating tubes will be of such dimensions as not to cause too high a wattage per square inch in order that the temperature difference between the liquid and the heating surfaces shall not be so high as to cause cracking of the liquid. The greater the heat difference between the heating tubes and the liquid the more rapid the circulation and the more rapidly the liquid is heated, but in any case the parts should be so designed as to hold this temperature difference below the point at which the liquid will be cracked or otherwise injuriously affected. On the other hand, the high velocity of the liquid in contact with the tubes permits of a higher temperature being maintained in the tubes, or in other words, permitting high wattage per square inch of surface. While the heater has been primarily designed for heating liquids, it might be also used for heating air, gases or vapors.

In the drawings forming part of this application,

Figure 1 is an elevation showing one embodiment of my invention in which view a portion of the tank is broken away to show the interior parts, Figure 2 is a plan view thereof, Figure 3 is a perspective view showing the parts for connecting the circuit terminals to the tubes, Figure 4 is a view similar to Figure 2 with a portion of the tank broken away to show the interior parts, Figure 5 is an enlarged sectional view showing the method of mounting the spider and the drain pipe, Figure 6 is a plan view of the spider for supporting the tubes, Figure 7 is an enlarged sectional view showing the method of attaching the electrical terminals to the tank, Figure 8 is a perspective view of some of the tubes and the connecting members, and Figure 9 is an enlarged view showing the manner of mounting the insulated supports on the bracket arm.

In Figure 1 I have shown my invention embodied in a heater of the closed type although it will be understood that in certain processes an open tank may be necessary or desirable, so that the tank may be modified according to the particular process for which the device is employed. In this view I have shown a tank 1 of cylindrical form, arranged in a vertical position and it may be supported on any foundation by means of the supporting brackets 2 attached to the side of the tank. The particular tank shown has a top or dome 3 and a circular bottom wall 4 both attached to the cylindrical wall by liquid tight joints. At the top of the tank there is an opening 5 covered by a detachable plate 6 and this opening forms a manhole by which access may be had to the interior of the tank for cleaning purposes. Liquid may be supplied to the tank through an inlet pipe 7 from any source of supply, and liquid may be withdrawn from the tank by means of the pipe 8 connected through the bottom wall in the manner hereinafter described. In addition, I have shown a connection 9 at the top of the tank to which a pipe may be attached for leading off the volatiles or vapors formed within the tank, and this pipe may conduct the vapors to a condenser (not shown).

Within the tank are arranged a series of tubes. While these may be disposed in various formations I have chosen to illustrate them as arranged in two circles, the tubes 10 forming an inner circle and the tubes 11 forming an outer circle concentric with the inner ones. While these tubes might be arranged in an inclined position, the greatest efficiency is to be obtained when they are vertically disposed, as shown in the drawings, in order that the highest velocity may be obtained in the liquid passing upwardly within them. These tubes are of less height than the tank, in order that they will terminate some distance below the top of the tank, and in operation the liquid level will always be maintained above the upper ends of the tubes in order that the latter will be entirely immersed within the liquid. These tubes are open throughout; or in other words, the bottom ends are open as well as the upper ends. I have shown them supported on insulated supports 12 which are in turn mounted upon a spider 13 consisting of a series of radial brackets 14 having their inner ends clamped together by means of bolts 15; and the central aperture 16 formed within the clamped ends of these brackets is threaded upon the upper end of a sleeve 17 which has a series of apertures 18 below the spider, through which the liquid contents of the tank may pass into the sleeve to be conducted by the draw-off pipe 8 into a container or rundown tank (not shown). The bottom of the tank is provided with a tubular neck 19 upon the lower end of which is formed a laterally extending flange 20; and there is a collar 21 having a corresponding laterally extending flange 22 which is bolted to the flange 20 by means of the bolts 23. The sleeve 17 has a shoulder 24 which rests upon the collar 21 and through this connection the spider, together with the insulating members 12 and the several tubes are supported.

The several tubes are connected electrically preferably in series or series parallel and for this purpose I have shown a number of straps fitted to the upper and lower ends of the tubes and preferably welded thereto. In Figure 8 I have shown by way of example a tube 11 of the outer circle connected at its bottom end by means of a strap 25 with the lower end of the tube 10 which is one of the inner circle of tubes. This latter tube has another strap 26 connected at its upper end and this strap also connects with the upper end of an adjacent tube 11' of the outer circle. The latter tube in turn has a strap 27 connected at its lower end and this strap is connected with another tube of those of the inner circle. As shown in Figure 4, this alternate upper and lower series of connecting straps is continued around the entire circle so that all of the tubes contained in the inner and outer circles are connected electrically in series or series parallel. In order to mechanically maintain the tubes in their proper position upon the support I have arranged a series of connecting straps to hold them in spaced relation at the points where there are no straps 25, 26. For instance, in Figure 8 I have shown a strap 28 connecting the upper end of the tube 11 with the upper end of the tube 10 as there is no metal strap 25 connecting these tubes at this point. The lower end of the tube 10 is likewise connected with the lower end of the tube 11' by a strap 29 as there is no metal strap connecting the tubes at this point. It will be understood that the straps 28 and 29 are repeated around the entire circle and these are necessarily made of insulating material in order not to destroy the series connection between the tubes. In other words, they merely act as mechanical spacers.

As explained above, the present device is adapted to be used either with direct current or with single or polyphase alternating current. In the drawings I have chosen to illustrate the method of connecting the tubes in a three phase alternating current circuit and the changes necessary for using other kinds of current will be understood. At the top of the tank there are shown three tubular extensions 30 arranged 120 degrees apart and each of these has a laterally extending flange 31 provided with apertures to receive bolts. These tubular extensions, shown enlarged in Figure 7 form a means for receiving through the tank suitable electrical conductors. The terminal strap 32 on the end of the feed wire 33 is bolted to the upper end of a rod 34 between the nuts 35 so that the rod is electrically connected with one of the feed wires of the three phase electric circuit. Each of the connectors running to the several tubular members 30 is the same in construction so that this description applies to all. The rod 34 extends through a bushing 36 which has a lateral flange 37 adapted to compress the annular ring 38 of insulating material against the flange 31. There is a sleeve 39 of insulating material surrounding the neck of the bushing and insulating it electrically from the neck 30. Within the tank there is a metal disc 40 surrounding the rod 34 and forced upwardly by the shoulder 41 of this rod so that it clamps the insulating washer 42 against the inner surface of the tank around the neck 30. There is a space formed between the rod and sleeve 39, below the lower end of the bushing 36 and this is preferably filled with a packing 43 which will prevent the vapors passing upwardly along the rod.

In operation of the device, liquid to be treated is supplied to the tank through the feed pipe 7 and the liquid after treatment within the tank is drawn off through the outflow pipe 8. Whether the apparatus is used for batch runs or continuous operation, the fluid level within the tank will always be maintained above the tops of the tubes 10, 11 or in other words, the tubes are at all times completely immersed in the fluid while the apparatus is in operation. If the process required that liquid be treated in a closed vessel, then the cover 6 is clamped down over the manhole and this closes the tank. Electric current is supplied by means of the cables 33 from any power line or source of power. In the present illustration of one embodiment of my invention, these cables supply three phase alternating current to the several rods 34. At three places around the circle of tubes, in the present illustration, there are three connecting straps 45, which differ from the remaining straps in the fact that they each have a central opening 46 to receive through it the lower end of one of the rods 34. There is a nut 47 which is threaded onto the lower end of the rod 34 to hold the flange 48 of the rod tight upon the strap 45, thus making a tight electrical connection between the several rods 34 and the special straps 45. As the feed wires in this example are connected 120 degrees apart around the bank of tubes the latter are connected in series parallel. Adjacent tubes of the bank are in series relation to one another.

As the tubes are made of high resistance metal they offer resistance to the passage of current in the circuit and this results in the tubes heating to a high degree. When this occurs, heat is given off by conduction from the tubes directly to the liquid in which they are immersed, this action taking place both exteriorly and interiorly. The fluid within the tubes is caused to flow upwardly and the greater the temperature of the tubes the greater the acceleration of this circulation of the liquid. Owing to the fact that the tubes are entirely immersed in the liquid there is direct conduction of heat from the tubes to the liquid resulting in high efficiency or low losses. Owing to the very rapid upward circulation of the liquid through the tubes a greater temperature difference as between the tubes and liquid may be maintained without destructive or cracking action upon the liquid; and therefore a high wattage per square inch of tube surface may be maintained, resulting in maximum efficiency from the standpoint of electrical consumption; and the heating action is very rapid.

In the above description I have set forth the construction and operation desirable where separation without cracking is to be accomplished but it will be apparent that in some processes, such as in the cracking of petroleum, it may be desirable to so proportion and operate the apparatus that actual cracking will take place and where that object is desired the present apparatus may be so used; and I do not wish to be understood as excluding such construction and operation from the scope of the present patent.

Having described my invention, what I claim is:

1. In an apparatus of the character described, a fluid receptacle, a set of substantially vertically arranged, open tubes completely immersed in the fluid under treatment in said receptacle so that the liquid is in contact with the inner and outer surfaces of said tubes, said tubes being made of high electrical resistance material, means for electrically connecting a plurality of adjacent tubes in series, and means for passing a current of electricity through a plurality of said tubes in series whereby they are heated by resistance.

2. In an apparatus of the character described, a fluid receptacle, a set of spaced substantially vertically arranged, open tubes completely immersed in the fluid under treatment in said receptacle so that the liquid is in contact with the inner and outer surfaces of said tubes, said tubes being made of electrical resistance material, conducting connections for connecting said tubes near their upper and lower ends in alternate relation, and means for passing an electric current through a plurality of said tubes in series whereby they are heated by resistance.

3. In an apparatus of the class described, a fluid receptacle, a set of spaced, substantially vertically arranged, open tubes completely immersed in the fluid under treatment in said receptacle so that the liquid is in contact with the inner and outer surfaces of said tubes, said tubes being made of electrical resistance material, conducting members connecting said tubes near their upper and lower ends in alternate relation, insulating members connecting adjacent ends of said tubes to hold them in spaced relation, and means for passing an electric current through a plurality of said tubes in series whereby they are heated by resistance.

Signed at city of New York, county of New York, State of New York, this 13th day of March, 1926.

WILLIAM WINSHIP.